US012085033B2

(12) United States Patent
Ashikaga et al.

(10) Patent No.: US 12,085,033 B2
(45) Date of Patent: Sep. 10, 2024

(54) CATALYST WARM-UP CONTROL METHOD FOR INTERNAL COMBUSTION ENGINE, AND CATALYST WARM-UP CONTROL DEVICE

(71) Applicant: NISSAN MOTOR CO., LTD., Yokohama (JP)

(72) Inventors: Akio Ashikaga, Kanagawa (JP); Kazuki Tanzawa, Kanagawa (JP); Takeshi Tsuyuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/268,084

(22) PCT Filed: Dec. 18, 2020

(86) PCT No.: PCT/JP2020/047407
§ 371 (c)(1),
(2) Date: Jun. 16, 2023

(87) PCT Pub. No.: WO2022/130614
PCT Pub. Date: Jun. 23, 2022

(65) Prior Publication Data
US 2024/0035424 A1    Feb. 1, 2024

(51) Int. Cl.
*F02D 41/02* (2006.01)
*F02P 5/15* (2006.01)

(52) U.S. Cl.
CPC .......... *F02D 41/024* (2013.01); *F02P 5/1506* (2013.01); *F02D 2200/0804* (2013.01)

(58) Field of Classification Search
CPC .. F02D 41/024; F02D 41/1446; F02D 41/029; F02D 41/405; F02D 41/0255;
(Continued)

(56) References Cited

U.S. PATENT DOCUMENTS 5,613,360 A    3/1997 Iwai et al.
5,992,143 A *  11/1999 Manaka ................ F02D 41/024
                                                        60/284
(Continued)

FOREIGN PATENT DOCUMENTS

JP   H07-229419 A    8/1995
JP   2002-295287 A   10/2002
(Continued)

*Primary Examiner* — Dapinder Singh
(74) *Attorney, Agent, or Firm* — Foley & Lardner LLP

(57) ABSTRACT

An internal combustion engine is mounted for power generation in a series hybrid vehicle and has an exhaust system with an upstream-side catalytic converter and a downstream-side catalytic converter. After starting of the internal combustion engine, the operation of the internal combustion engine is continued, without stopping the internal combustion engine even when the power generation request ceases, until completion of the warm-up of both of the upstream-side catalytic converter and the downstream-side catalytic converter. The internal combustion engine is operated with ignition timing retardation during a first period from the starting of the internal combustion engine to the completion of the warm-up of the upstream-side catalytic converter. During a second period from the completion of the warm-up of the upstream-side catalytic converter to the completion of the warm-up of the downstream-side catalytic converter, the internal combustion engine is operated without ignition timing retardation.

6 Claims, 4 Drawing Sheets

(58) Field of Classification Search
CPC .. F02D 41/0235; F02D 41/064; F02D 41/062;
F02D 41/0245; F02D 41/025; F02D
37/02; F02D 2200/0804; F02D
2200/0802; F02P 5/1506; F01N 9/00;
F01N 13/009; F01N 3/2006; F01N 11/00;
F01N 2900/1602; F01N 2900/08; F01N
2900/1404; F01N 2900/00; F01N
2900/0422; F01N 2900/04; F01N 2560/06
See application file for complete search history.

(56) References Cited

U.S. PATENT DOCUMENTS

| | | | |
|---|---|---|---|
| 6,340,014 B1* | 1/2002 | Tomita | F02D 41/3094 |
| | | | 123/295 |
| 8,099,223 B2* | 1/2012 | Hirooka | F02P 5/1506 |
| | | | 123/406.19 |
| 10,119,480 B2* | 11/2018 | Yamaguchi | F02D 41/024 |
| 2002/0162320 A1 | 11/2002 | Uchida et al. | |
| 2015/0218989 A1* | 8/2015 | Kaneko | F02D 41/025 |
| | | | 60/286 |
| 2016/0304083 A1 | 10/2016 | Teraya et al. | |
| 2017/0074176 A1 | 3/2017 | Yokoyama et al. | |
| 2020/0362773 A1* | 11/2020 | Suzuki | F02D 41/024 |

FOREIGN PATENT DOCUMENTS

| | | |
|---|---|---|
| JP | 2009-036021 A | 2/2009 |
| JP | 2016-112962 A | 6/2016 |
| JP | 2016-120853 A | 7/2016 |
| JP | 2017-052500 A | 3/2017 |

* cited by examiner

CATALYST WARM-UP CONTROL METHOD FOR INTERNAL COMBUSTION ENGINE, AND CATALYST WARM-UP CONTROL DEVICE

TECHNICAL FIELD

The present invention relates to an internal combustion engine for power generation in a series hybrid vehicle, and more specifically relates to catalyst warm-up control after starting of the internal combustion engine.

BACKGROUND ART

Patent Document 1 discloses a technique for catalyst warm-up control of an internal combustion engine in a hybrid vehicle, the hybrid vehicle having both of the internal combustion engine and a motor/generator as running drive sources, an exhaust system of the internal combustion engine having a first catalyst on an upstream side thereof and a second catalyst on a downstream side thereof, wherein that the operating conditions such as load of the internal combustion engine during warm-up operation of the first catalyst are set different from those during warm-up operation of the second catalyst.

In the above-disclosed conventional control technique, however, the internal combustion engine is stopped, even without completion of the catalyst warm-up operation, when the output requested of the internal combustion engine becomes low depending on the running state of the vehicle. This results in exhaust gas purification of the internal combustion engine not always being achieved sufficiently.

Patent Document 2 also discloses a technique for control of an internal combustion engine, wherein the internal combustion engine is stopped when the output requested of the internal combustion engine becomes low during catalyst warm-up operation. It is described in Patent Document 2 as an unfavorable example of the control that the operation of the internal combustion engine could be continued until completion of the catalyst warm-up operation. However, the internal combustion engine disclosed in Patent Document 2 has only one catalyst corresponding to an upstream-side catalyst. In this patent document, no consideration is given to the case where the internal combustion engine has a plurality of catalysts.

PRIOR ART DOCUMENTS

Patent Documents

Patent Document 1: Japanese Laid-Open Patent Publication No. 2016-112962
Patent Document 2: Japanese Laid-Open Patent Publication No. 2016-120853

SUMMARY OF THE INVENTION

According to the present invention, there is provided a catalyst warm-up control technique for an internal combustion engine, the internal combustion engine being mounted for power generation in a series hybrid vehicle and being controllable to be started or stopped according to a power generation request from the vehicle side, the internal combustion engine comprising an exhaust system with a first catalyst on a relatively upstream side thereof and a second catalyst on a relatively downstream side thereof, wherein, after starting of the internal combustion engine, the operation of the internal combustion engine is continued until warm-up of the first and second catalysts is judged as completed.

Since the operation of the internal combustion engine is continued until the completion of the warm-up of the second catalyst as described above, the internal combustion engine exhibits good exhaust performance.

DESCRIPTION OF EMBODIMENTS

Hereinafter, one embodiment of the present invention will be described in detail below with reference to the drawings.

Figure 1:
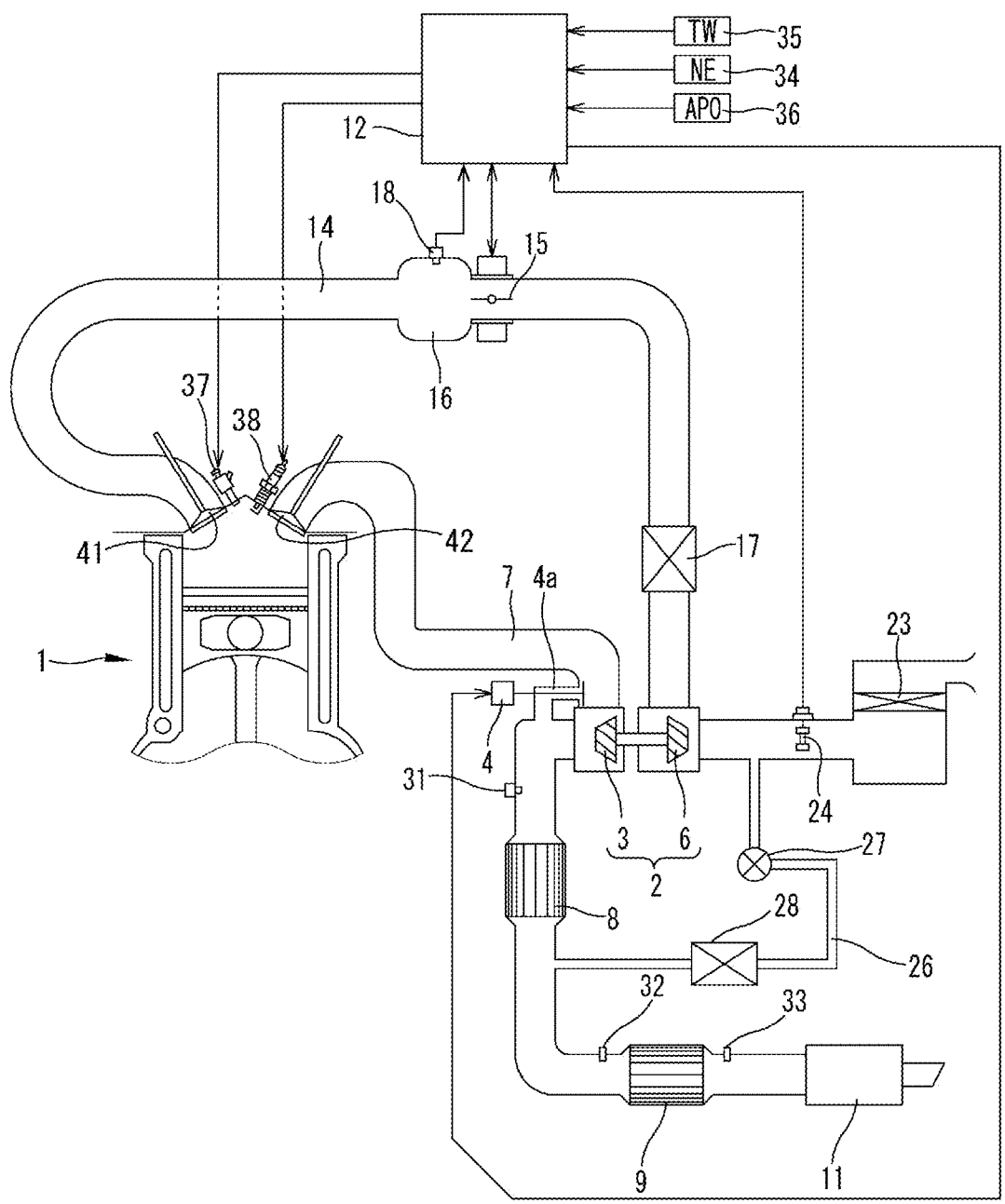
FIG. 1 is a system configuration diagram of an internal combustion engine to which one embodiment of the present invention is applied.

FIG. 1 is a system configuration diagram of an internal combustion engine 1 to which one embodiment of the present invention is applied. The internal combustion engine 1 is mounted for power generation in a series hybrid vehicle. The series hybrid vehicle is a hybrid vehicle of the type that runs by driving a generator by an internal combustion engine and driving a motor with power generated by driving of the generator. In other words, the series hybrid vehicle has: a motor/generator that mainly functions as a generator for generating power; the internal combustion engine 1 used as a power-generating internal combustion engine for driving the power-generating motor/generator according to a power request; a running motor/generator that mainly functions as a motor for driving vehicle drive wheels, a battery that temporarily stores the generated power and an inverter unit that performs power conversion between the battery and the respective motor/generator.

In the present embodiment, the internal combustion engine 1 is configured as a four-stroke spark-ignition gasoline engine and is equipped with a turbocharger 2 as shown in FIG. 1. An exhaust turbine 3 of the turbocharger 2 is disposed in an exhaust passage 7 of the internal combustion engine 1. An upstream-side catalytic converter 8 and a downstream-side catalytic converter 9, each using e.g. a three-way catalyst, are disposed in the exhaust passage at positions downstream of the exhaust turbine 3. In general, the upstream-side catalytic converter 8 is fixed to an outlet portion of the exhaust turbine in an engine room of the internal combustion engine; and the downstream-side catalytic converter 9 is fixed in position under the floor of the vehicle body. An exhaust muffler 11 is disposed in a further downstream part of the exhaust passage 7 such that the exhaust passage 7 is open to the outside through the exhaust muffler 11.

The turbocharger 2 has: a bypass passage 4a that provides communication between outlet and inlet sides of the exhaust passage 3 for boost pressure control; and an electrically-operable waste gate valve 4 that opens and closes the bypass passage 4a.

A compressor 6 of the turbocharger 2 is disposed in an intake passage 14 of the internal combustion engine 1. An electronically-controllable throttle valve 15 for controlling an intake air amount is disposed in the intake passage 14 at a position downstream of the compressor 6. The throttle valve 15 is positioned in an inlet portion of a collector part 16. A part of the intake passage 14 downstream of the collector part 16 is branched, as an intake manifold, toward the respective cylinders. A water-cooled intercooler 17 for cooling turbocharged intake air is disposed in a part of the intake passage 4 upstream of the collector part 16, i.e., between the compressor 6 and the collector part 16. Further, a pressure sensor 18 for detecting an intake air pressure in the collector part 16 (as boost pressure) is fixed to the collector part 16.

In the present invention, the internal combustion engine 1 may alternatively be a naturally aspirated engine without a supercharger.

An air cleaner 23 is disposed in the most upstream part of the intake passage 14. An airflow meter 24 for detecting an intake air amount is disposed in the intake passage at a position downstream of the air cleaner 23.

An exhaust gas recirculation passage 26 is provided between the exhaust passage 7 and the intake passage 14 to recirculate a part of exhaust gas into the intake system. The exhaust recirculation passage 26 has one, upstream end portion branched from the exhaust passage 7 at a position downstream of the upstream-side catalytic converter 8 and the other, downstream end portion connected to the intake passage 14 at a position upstream of the compressor 6. An exhaust recirculation control valve 27 whose opening is adjusted according to operating conditions is provided at a midpoint in the exhaust recirculation passage 26. An EGR gas cooler 28 for cooling recirculated exhaust gas is disposed in the exhaust recirculation gas passage at a position closer to the exhaust passage 7 than the exhaust gas recirculation control valve 27.

An air-fuel ratio sensor 31 is disposed on an inlet side of the upstream-side catalytic converter 8. An oxygen sensor 32 is disposed on an inlet side of the downstream-side catalytic converter 9. An exhaust gas temperature sensor 33 is disposed on an outlet side of the downstream-side catalytic converter 9.

The internal combustion engine 1 is comprehensively controlled by an engine controller 12. To the engine controller 12, there are inputted detection signals from various sensors including not only the airflow meter 24 and the pressure sensor 18, but also a crank angle sensor 34 for detecting an engine rotation speed, a coolant temperature sensor 35 for detecting a coolant temperature, an accelerator opening sensor 36 for detecting an amount of depression of an accelerator pedal operated by a driver, and the like. Based on these detection signals, the engine controller 12 optimally controls the fuel injection amount and timing of a fuel injection valve 37, the ignition timing of a spark plug 38, the opening of the throttle valve 15, the opening of the waste gate valve 4, the opening of the exhaust gas recirculation control valve 27 and the like. Although not specifically shown in the drawings, the internal combustion engine 1 has an intake-side variable valve timing mechanism for varying the valve timing of intake valves 41 and an exhaust-side variable valve timing mechanism for varying the valve timing of exhaust valves 42 in the present embodiment. The engine controller 12 also controls these variable valve timing mechanisms as appropriate.

In the present embodiment, the engine controller 12 executes a predetermined catalyst warm-up control routine at a cold start of the internal combustion engine 1 for early activation of the catalytic converters 8 and 9.

Figure 2:
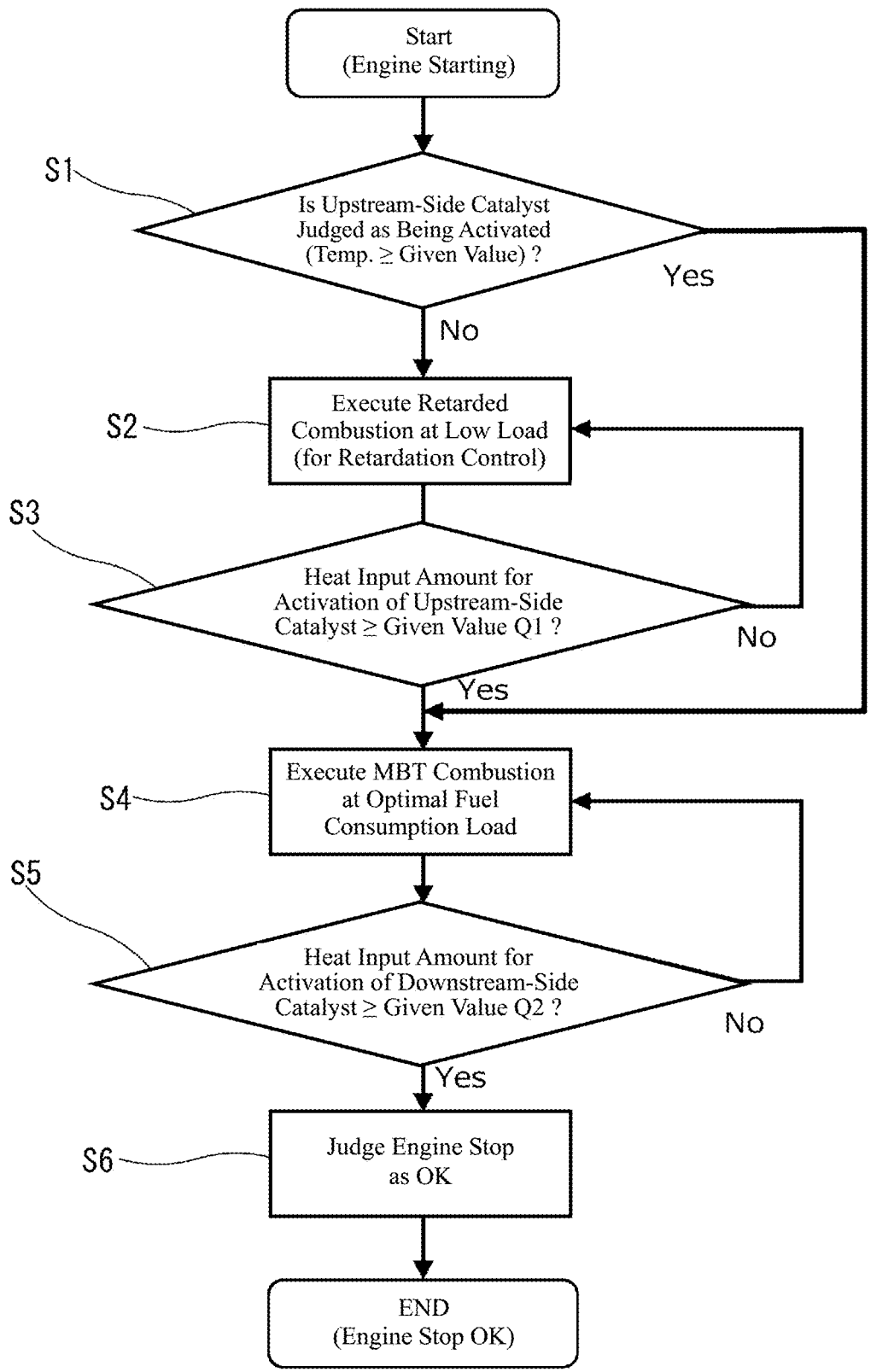
FIG. 2 is a flowchart of catalyst warm-up control executed after starting of the internal combustion engine according to one embodiment of the present invention.

FIG. 2 is a flowchart of the catalyst warm-up control routine executed by the engine controller 12. The routine of FIG. 2 is initiated concurrently with starting of the internal combustion engine 1. Herein, the internal combustion engine 1 is started upon the generation of a power generation request after the starting of the vehicle.

First, it is judged in step 1 whether the temperature of the upstream-side catalytic converter 8 at the starting of the internal combustion engine 1 is higher than or equal to a catalyst activation temperature. This judgment is made by estimating the catalyst temperature based on the information about the catalyst temperature at the end of the previous trip (i.e. at the time of key-off event) (as determined from the detection temperature of the exhaust gas temperature sensor 33) and the time lapsed from the end of the previous trip, and then, comparing the estimated catalyst temperature with a given threshold value (corresponding to the catalyst activation temperature). When the temperature of the upstream-side catalytic converter 8 has reached the activation temperature, the routine proceeds to the processing of step 4 and subsequent steps.

When the temperature of the upstream-side catalytic converter 8 is lower than the activation temperature, that is, when the upstream-side catalytic converter 8 is in an unwarmed state, the routine goes from step 1 to step 2. In step 2, the internal combustion engine 1 is operated at relatively low load and low engine rotation speed with significant ignition timing retardation for catalyst warm-up. The ignition timing retardation causes an increase of the exhaust gas temperature and shifts the center of gravity of combustion to a retarded side, thereby promoting catalyst warm-up especially of the upstream-side catalytic converter 8.

Then, the routine goes to step 3. In step 3, the warm-up state of the upstream-side catalytic converter 8 is estimated. More specifically, this estimation is done as follows. The amount of heat input to the upstream-side catalytic converter 8 (that is, the amount of heat released from the exhaust port and transferred to the upstream-side catalytic converter 8) per cycle is calculated based on the operating parameters of the internal combustion engine 1 including the engine rotation speed and load, the ignition timing (retard amount), the valve timings of the intake and exhaust valves 41 and 42, the exhaust gas recirculation rate, the fuel injection timing, the fuel pressure and the like. The calculation results are successively summed and accumulated. The thus-obtained heat input amount is compared with a given threshold value (Q1). It is judged that the warm-up of the upstream-side catalytic converter 8 has been completed when the heat input amount is larger than or equal to the threshold value (Q1). Until the heat input amount reaches the threshold value (Q1), the routine goes back from step 3 to step 2 whereby the relatively low-speed, low-load operation of the internal combustion engine with significant ignition timing retardation is continued. The warm-up completion judgment of step 3 is made repeatedly. During this period of time, the internal combustion engine 1 is continuously operated, without being stopped, even when the output of the power generation request to the internal combustion engine 1 ceases. The heat input amount threshold value (Q1) used for the judgment of step 3 may be set variably in accordance with the temperature of the upstream-side catalytic converter 8 at the starting of the engine as determined in step 1, or may be set constant regardless of the temperature of the upstream-side catalytic converter 8 at the starting of the engine.

When the warm-up of the upstream-side catalytic converter 8 is judged as completed, the routine goes from step 3 to step 4. In step 4, the internal combustion engine 1 is kept operated by stopping the ignition timing retardation and relatively increasing the engine rotation speed and load. More specifically, the ignition timing is set in the vicinity of MBT; and the engine rotation speed and load are set in the vicinity of the optimal fuel consumption point. In other words, the operation of the internal combustion engine 1 is continued so as to allow catalyst warm-up of the downstream-side catalytic converter 9 while avoiding an excessive deterioration of fuel efficiency.

When the estimated temperature of the upstream-side catalytic converter 8 at the starting of the internal combustion engine 1 is higher than or equal to the threshold value, the routine immediately goes to step 4 whereby the operation of the internal combustion engine 1 in the vicinity of the optimal fuel consumption point is started with the ignition timing set in the vicinity of MBT.

Subsequently, the warm-up state of the downstream-side catalytic converter 9 is estimated in step 5. More specifically, this estimation is done in the same manner as in step 3. The amount of heat input to the downstream-side catalytic converter 9 (that is, the amount of heat released from the exhaust port and transferred to the downstream-side catalytic converter 9 via the upstream-side catalytic converter 8) per cycle is calculated based on the operating parameters of the internal combustion engine 1 including the engine rotation speed and load, the ignition timing (retard amount), the valve timings of the intake and exhaust valves 41 and 42, the exhaust gas recirculation rate, the fuel injection timing, the fuel pressure and the like. The calculation results are successively summed and accumulated. The thus-obtained heat input amount is compared with a given threshold value (Q2). It is judged that the warm-up of the downstream-side catalytic converter 9 has been completed when the heat input amount is larger than or equal to the threshold value (Q2). Until the heat input amount reaches the threshold value (Q2), the routine goes back from step 5 to step 4 whereby the operation of the internal combustion engine in the vicinity of the optical fuel consumption point is continued without ignition timing retardation. The warm-up completion judgment of step 5 is made repeatedly. During this period of time, the internal combustion engine 1 is continuously operated, without being stopped, even when the power generation request to the internal combustion engine 1 ceases. In the present embodiment, the heat input amount threshold value (Q2) used for the judgment of step 5 may be set variably in accordance with the temperature of the downstream-side catalytic converter 9 at the starting of the engine (which can be estimated separately from the temperature of the upstream-side catalytic converter 8 or be determined from the estimated temperature of the upstream-side catalytic converter 8), or may be set constant regardless of the temperature of the downstream-side catalytic converter 9 at the starting of the engine.

When the warm-up of the downstream-side catalytic converter 9 is judged as completed, the routine goes from step 5 to step 6. In step 6, stopping of the internal combustion engine 1 according to the power generation request is permitted. With this, the internal combustion engine 1 is stopped at the time when the power generation request ceases.

After the warm-up of the catalytic converter 8, 9 is once completed, the operation of the internal combustion engine 1 is appropriately controlled in such a manner that the catalyst temperature does not becomes lower than the activation temperature.

As described above, in the present embodiment, the operation of the internal combustion engine 1 is continued, irrespective of the power generation respect, until the completion of the catalyst warm-up of both of the upstream-side catalytic converter 8 and the downstream-side catalytic converter 9 after the initial starting of the internal combustion engine 1. Therefore, the upstream-side catalytic converter 8 and the downstream-side catalytic converter 9 reliably ensure exhaust gas purification performance.

Until the completion of the catalyst warm-up of the upstream-side catalytic converter 8, the internal combustion engine is operated at relatively low speed and low load with significant ignition timing retardation. This enables early activation of the upstream-side catalytic converter 8 while minimizing a deterioration of exhaust performance during the time up until the activation of the upstream-side catalytic converter 8. After the completion of the catalyst warm-up of the upstream-side catalytic converter 8, the internal combustion engine is operated in the vicinity of the optimal fuel consumption point with the normal ignition timing in the vicinity of MBT. This enables activation of the downstream-side catalytic converter 9 while suppressing a deterioration of fuel efficiency.

Figure 3:
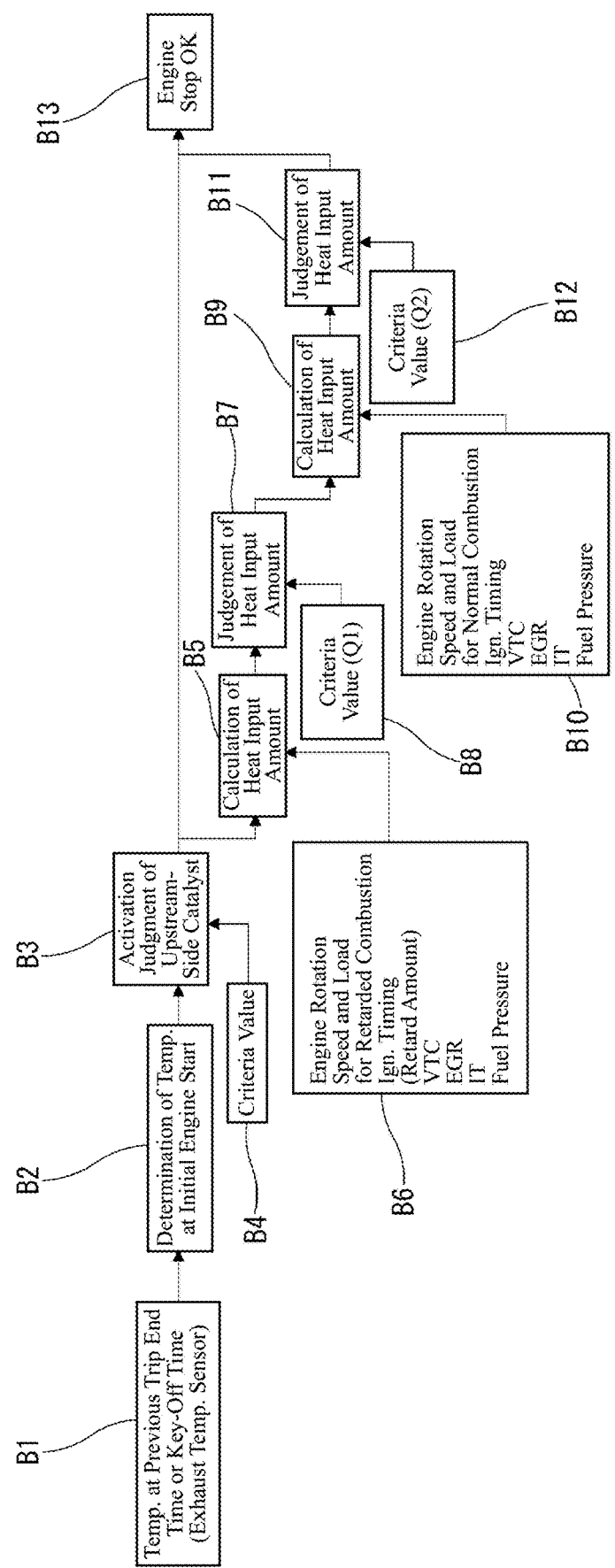
FIG. 3 is a functional block diagram for the catalyst warm-up control.

FIG. 3 is a block diagram for the catalyst warm-up control. It is herein noted that there is no difference between the control contents shown in this block diagram and the control contents shown in the flowchart of FIG. 2.

The information about the catalyst temperature of the upstream-side catalytic converter 8 at the end of the previous trip (i.e. at the time of key-off event) (as determined from the detection temperature of the exhaust gas temperature sensor 33) and the time lapsed from the end of the previous trip, both given in the block B1, are sent to the block B2. Based on these parameters, the catalyst temperature of the upstream-side catalytic converter 8 at the starting of the internal combustion engine 1 is determined in the block B2. In the block B3, the warm-up completion judgment is made by comparing the determined catalyst temperature of the upstream-side catalytic converter 8 with the threshold value (criteria value) set in the block B4. When the upstream-side catalytic converter is in the unwarmed state, the internal combustion engine is operated at low load and low rotation speed with ignition timing retardation as described above.

In the block B5, the amount of heat input to the upstream-side catalytic converter 8 is calculated using various parameters (such as engine rotation speed and load, ignition timing (retard amount), valve timings, exhaust gas recirculation rate, fuel injection timing and fuel pressure) sent from the block B6. In the block B7, the calculated heat input amount is compared with the threshold value (criteria value) Q1 set in the block B8. When the calculated heat input amount reaches the threshold value Q1, the internal combustion engine is shifted to operation at rotation speed and load in the vicinity of the optimal fuel consumption point with the normal ignition timing in the vicinity of MBT.

In the block B9, the amount of heat input to the downstream-side catalytic converter 9 is calculated using various parameters (such as engine rotation speed and load, ignition timing, valve timings, exhaust gas recirculation rate, fuel injection timing and fuel pressure) sent from the block B10. In the block B1, the calculated heat input amount is compared with the threshold value (criteria value) Q2 set in the block B12. When the calculated heat input amount reaches the threshold value Q2, stopping of the internal combustion engine 1 is permitted in the block B13.

Figure 4:
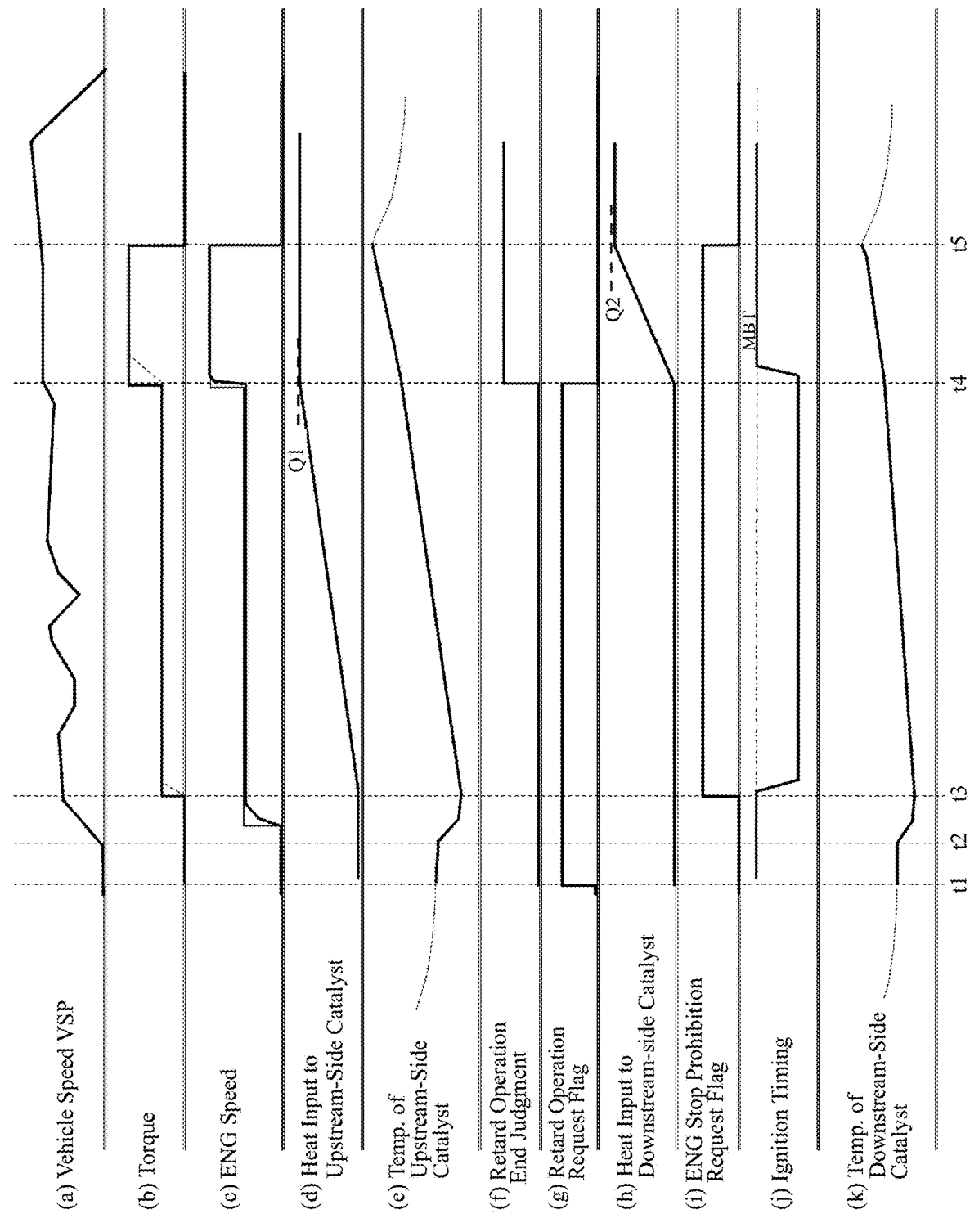
FIG. 4 is a time chart of an example of the catalyst warm-up control.

FIG. 4 shows a time chart of changes of the respective functions and parameters under the catalyst warm-up control according to the present embodiment. From the top side in the figure, shown are the changes of: (a) the vehicle speed; (b) the torque (load) of the internal combustion engine; (c) the rotation speed of the internal combustion engine 1; (d) the calculated heat input amount of the upstream-side catalytic converter 8; (e) the temperature of the upstream-side catalytic converter 8; (f) the ignition timing retard operation end judgment flag; (g) the ignition timing retard operation request flag; (h) the calculated heat input amount of the downstream-side catalytic converter 9; (i) the stop prohibition request flag for requesting stopping of the internal combustion engine 1; ( ) the ignition timing; and (k) the temperature of the downstream-side catalytic converter 9.

In this time chart, the vehicle is placed in a key-on state at time t1. Concurrently, the ignition timing retard operation request flag is turned on as shown in the section (g). There is generated a power generation request upon starting of the vehicle at time t2. The internal combustion engine 1 is then started. The autonomous operation of the internal combustion engine 1 begins at time t3. At this time, the retard operation for catalyst warm-up is performed, with the ignition timing significantly retarded and the engine rotation speed and load set relatively low, according to the ignition timing retard operation request flag as shown in the section (g). During the period from time t1 to time t3, the temperatures of the upstream-side catalytic converter 8 and the downstream-side catalytic converter 9 are slightly lowered as shown in the sections (a) and (k) because these catalytic converters are cooled by vehicle running wind.

During the operation of the engine with the retarded ignition timing, the heat input amount of the upstream-side catalytic converter 8 increases as shown in the section (d). At time t4, the heat input amount of the upstream-side catalytic converter reaches the given threshold value Q1. With this, the ignition timing retard operation request flag is turned off as shown in the section (g). The internal combustion engine is then shifted to the operation in the vicinity of the optimal fuel consumption point where the engine rotation speed and load are set relatively high with the ignition timing set in the vicinity of MBT.

During the operation of the engine in the vicinity of the optimal fuel consumption point, the heat input amount of the downstream-side catalytic converter 9 increases as shown in the section (h). At time t5, the heat input amount of the downstream-side catalytic converter 9 reaches the given threshold value Q2. With this, the stop prohibition request flag is turned off. Herein, the example of FIG. 4 is based on the assumption that the power generation request ceases before time t5. The operation of the internal combustion engine 1 is stopped (see the sections (b) and (c)) when the stop prohibition request flag is turned off at time t5. From time t5 onward, the so-called EV running is performed with the supply of power from the battery. During the period in which the stop prohibition request flag is turned on, the operation of the internal combustion engine 1 is not stopped irrespective of the power generation request. In other words, the operation of the internal combustion engine 1 is continued until the completion of catalyst warm-up of both of the upstream-side catalytic converter 8 and the downstream-side catalytic converter 9 as described above.

As shown in the section (k), the temperature of the downstream-side catalytic converter 9 has been gradually increasing since before time t4. However, the summing/accumulation of the heat input to the downstream-side catalytic converter 9 is started from time t4. This leads to simplification of the control.

In the example of FIG. 4, the period from time t3 to time 4 corresponds to the claimed first period; and the period from time t4 to time 5 corresponds to the claimed second period.

Although the present invention has been described above by way of the above specific example, the present invention is not limited to the above-described specific embodiment. Various changes and modifications of the above-described embodiment are possible within the range that does not depart from the scope of the present invention.

For example, the estimation of the temperatures and warm-up states of the upstream-side catalytic converter 8 and the downstream-side catalytic converter 9 can be done by various methods. Alternatively, the temperatures and warm-up states of the catalytic converters can be determined by direct detection with the use of temperature sensors.

Furthermore, the present invention is also applicable to the case where an intermediate catalytic converter is additionally disposed between the upstream-side catalytic converter 8 and the downstream-side catalytic converter 9.

The invention claimed is:

1. A catalyst warm-up control method for an internal combustion engine,
the internal combustion engine being mounted for power generation in a series hybrid vehicle and being controllable to be started or stopped according to a power generation request from a vehicle side, the internal combustion engine comprising an exhaust system having a first catalyst in an upstream side thereof and a second catalyst on a downstream side thereof,
the catalyst warm-up control method comprising:
after starting of the internal combustion engine, detecting or estimating catalyst warm-up states of the respective first and second catalysts; and
until judging completion of warm-up of the first and second catalysts, continuing operation of the internal combustion engine, without stopping the internal combustion engine, both (i) when the power generation request is provided and (ii) when the power generation request ceases,
wherein the internal combustion engine is operated with ignition timing retardation for catalyst warm-up during a first period from the starting of the internal combustion engine to the completion of the warm-up of the first catalyst, and is operated without ignition timing retardation during a second period from the completion of the warm-up of the first catalyst to the completion of the warm-up of the second catalyst.

2. The catalyst warm-up control method for the internal combustion engine according to claim 1,
wherein, during the second period, the internal combustion engine is operated at engine rotation speed and load in the vicinity of an optimal fuel consumption point, and
wherein, during the first period, the internal combustion engine is operated at lower engine rotation speed and lower load than those during the second period.

3. The catalyst warm-up control method for the internal combustion engine according to claim 1,
wherein the catalyst warm-up state of the first catalyst is estimated by calculating an amount of heat input to the first catalyst from the starting of the internal combustion engine, and
wherein, when the amount of heat supplied to the first catalyst reaches a predetermined criteria value, the warm-up of the first catalyst is judged as completed.

4. The catalyst warm-up control method for the internal combustion engine according to claim 3,
  wherein an initial temperature of the first catalyst at the starting of the internal combustion engine is detected or estimated, and
  wherein the predetermined criteria value is set based on the initial temperature.

5. The catalyst warm-up control method for the internal combustion engine according to claim 1,
  wherein the catalyst warm-up state of the second catalyst is estimated by calculating an amount of heat input to the second catalyst from the judgment of the completion of the warm-up of the first catalyst, and
  when the amount of heat input to the second catalyst reaches a predetermined second criteria value, the warm-up of the second catalyst is judged as completed.

6. A catalyst warm-up control device for an internal combustion engine,
  the internal combustion engine being mounted for power generation in a series hybrid vehicle and comprising an exhaust system having a first catalyst in an upstream side thereof and a second catalyst on a downstream side thereof,
  the catalyst warm-up control device being configured to:
    command starting or stopping of the internal combustion engine according to a power generation request from a vehicle side;
    estimate or detect catalyst warm-up states of the respective first and second catalysts; and
    until judging completion of warm-up of the first and second catalysts, continue operation of the internal combustion engine, without stopping the internal combustion engine, both (i) when the power generation request is provided and (ii) when the power generation request ceases,
  wherein the internal combustion engine is operated with ignition timing retardation for catalyst warm-up during a first period from the starting of the internal combustion engine to the completion of the warm-up of the first catalyst, and is operated without ignition timing retardation during a second period from the completion of the warm-up of the first catalyst to the completion of the warm-up of the second catalyst.

\* \* \* \* \*